US008773686B2

(12) United States Patent
Terajima

(10) Patent No.: US 8,773,686 B2
(45) Date of Patent: Jul. 8, 2014

(54) IMAGE PROCESSING METHOD AND IMAGE PROCESSING APPARATUS

(75) Inventor: Hisao Terajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1671 days.

(21) Appl. No.: 11/554,479

(22) Filed: Oct. 30, 2006

(65) Prior Publication Data

US 2007/0097435 A1 May 3, 2007

(30) Foreign Application Priority Data

Nov. 1, 2005 (JP) ................................ 2005-317858

(51) Int. Cl.

*G06F 15/00* (2006.01)
*G06F 3/12* (2006.01)
*G06K 1/00* (2006.01)
*G06K 9/36* (2006.01)
*G06K 15/00* (2006.01)

(52) U.S. Cl.

USPC ......... 358/1.15; 358/1.1; 358/1.13; 358/1.16; 358/1.18; 382/284; 399/84

(58) Field of Classification Search

USPC ............. 358/1.13, 1.15, 1.16, 1.17, 1.18, 1.9, 358/474, 448, 1.2, 1.6, 1.12; 345/626, 629, 345/636, 619, 505; 715/207, 838, 825; 385/1.13, 1.15, 1.16, 1.17, 1.18, 1.9, 385/474, 448

See application file for complete search history.

(56) References Cited

U.S. PATENT DOCUMENTS

| | | | | |
|---|---|---|---|---|
| 5,666,214 | A * | 9/1997 | MacKinlay et al. | 358/453 |
| 5,715,034 | A * | 2/1998 | Yamamoto | 355/40 |
| 5,915,858 | A * | 6/1999 | Wen | 400/61 |
| 6,535,298 | B2 * | 3/2003 | Winter et al. | 358/1.16 |
| 6,563,598 | B1 * | 5/2003 | Johnson et al. | 358/1.15 |
| 6,714,209 | B2 * | 3/2004 | Van Valer | 345/629 |
| 6,718,517 | B1 * | 4/2004 | Davis | 715/207 |
| 6,956,671 | B2 * | 10/2005 | Monty et al. | 358/1.9 |
| 7,142,318 | B2 * | 11/2006 | Lopez et al. | 358/1.15 |
| 7,175,355 | B2 * | 2/2007 | Narusawa | 400/76 |
| 7,315,391 | B2 * | 1/2008 | Nakano et al. | 358/1.15 |
| 7,318,202 | B2 * | 1/2008 | Sugiyama et al. | 715/788 |
| 7,440,123 | B2 * | 10/2008 | Chodagiri et al. | 358/1.13 |
| 7,443,418 | B2 * | 10/2008 | Bryant et al. | 348/207.1 |
| 7,471,423 | B2 * | 12/2008 | Maki et al. | 358/3.26 |
| 7,508,535 | B2 * | 3/2009 | Hart et al. | 358/1.15 |

(Continued)

FOREIGN PATENT DOCUMENTS

| | | |
|---|---|---|
| JP | 63-036669 A | 2/1988 |
| JP | 2002-273973 A | 9/2002 |

(Continued)

*Primary Examiner* — Firmin Backer
*Assistant Examiner* — Jonathan Beckley
(74) *Attorney, Agent, or Firm* — Canon USA Inc. IP Division

(57) ABSTRACT

An image processing method includes printing out a layout mark-sensing sheet indicating a plurality of different sample image layout options that graphically indicate different layouts of an image to be printed on a recording medium that has a specific shape. The layout mark-sensing sheet allows a user to mark the layout mark-sensing sheet to designate a specific image layout option from among the plurality of different sample image layout options. The layout mark-sensing sheet marked by the user is read and the image is printed on the recording medium based on the specific image layout option marked by the user on the layout mark-sensing sheet.

13 Claims, 10 Drawing Sheets

(56) References Cited

U.S. PATENT DOCUMENTS

| | | | | |
|---|---|---|---|---|
| 7,522,174 | B2 * | 4/2009 | Yamamoto et al. | 345/619 |
| 7,525,675 | B2 * | 4/2009 | Shelton et al. | 358/1.13 |
| 7,551,311 | B2 * | 6/2009 | Uotani | 358/1.18 |
| 7,551,315 | B2 * | 6/2009 | Hoshii et al. | 358/1.2 |
| 7,554,680 | B2 * | 6/2009 | Kanai et al. | 358/1.1 |
| 7,561,296 | B2 * | 7/2009 | Fujinaga | 358/1.18 |
| 2002/0154337 | A1 * | 10/2002 | Sakata | 358/1.16 |
| 2003/0002064 | A1 * | 1/2003 | Otsuki | 358/1.13 |
| 2004/0047001 | A1 * | 3/2004 | Gehring et al. | 358/1.18 |
| 2004/0263545 | A1 * | 12/2004 | Esaki et al. | 347/5 |
| 2005/0213174 | A1 * | 9/2005 | Maki et al. | 358/540 |
| 2005/0235196 | A1 | 10/2005 | Iwanaga | |
| 2005/0237578 | A1 * | 10/2005 | Ikeda et al. | 358/302 |
| 2006/0044581 | A1 * | 3/2006 | Cavill et al. | 358/1.12 |
| 2006/0268359 | A1 * | 11/2006 | Maki et al. | 358/448 |
| 2007/0019020 | A1 * | 1/2007 | Wakai | 347/15 |
| 2007/0076980 | A1 * | 4/2007 | Maeda et al. | 382/284 |

FOREIGN PATENT DOCUMENTS

| | | | |
|---|---|---|---|
| JP | 2002-290880 | A | 10/2002 |
| JP | 2003-30670 | A | 1/2003 |
| JP | 2004-114485 | A | 4/2004 |
| JP | 2004-255760 | A | 9/2004 |
| JP | 2005-039366 | A | 2/2005 |
| JP | 2005-284940 | A | 10/2005 |

* cited by examiner

IMAGE PROCESSING METHOD AND IMAGE PROCESSING APPARATUS

BACKGROUND OF THE INVENTION

1. Field of the Invention

The present invention relates to an image processing method for specifying image data to be printed out by a recording unit according to information described in a mark-sensing sheet that is read by an image reading unit, and also to an image processing apparatus that uses the image processing method.

2. Description of the Related Art

Some conventional printing apparatuses, such as printers, are configured to be able to perform printing on a recording medium other than paper, for example, a plastic sheet for an overhead projector (OHP).

In addition, in recent years, various types of storage medium disks, such as a compact disk-recordable (CD-R) and a digital versatile disk-recordable (DVD-R), that have a label side on which printing can be performed are provided. In addition, printers that are capable of performing printing on the label side of a storage medium disk described above are already marketed.

With such a printer, a user can print, on the label side of a storage medium disk, such as a CD-R or a DVD-R, that stores photograph data taken by a digital camera or moving image data taken by a video camera, a user's favorite image (for example, a still image or a clip image of moving image data stored in the storage medium disk) or a character string, such as a caption or a title of the image.

Meanwhile, in controlling an image printing of an image photographed by a digital camera that is capable of photographing a moving image or a still image or in performing printing on a label, label printing-dedicated application software that is installed on a personal computer (PC) is commonly used. In this regard, however, recently, in a multifunction peripheral (hereinafter referred to as an "MFP") type printer to which a digital camera or a memory card can be directly connected, such printing processing (print control processing such as a direct print) can be performed with the printer alone instead of using a PC.

The above-mentioned MFP includes various types of interfaces, such as a universal serial bus (USB) or an IEEE1394 serial bus for connecting to a digital camera, and a card slot for a storage medium such as a memory card (for example, a secure digital (SD) card or a compact flash (CF) card), and is capable of printing an image stored in the digital camera or the memory card on the label-side surface of a storage medium disk while applying a desired layout thereto.

In addition, a type of MFP that includes a display unit having a limited area of display and has an image reading unit such as a scanner, as discussed in Japanese Patent Application Laid-Open No. 2002-273973, is configured to print a mark-sensing sheet that contains thumbnail images and mark fields. A user can put a mark on a mark filed and cause the scanner of the MFP to read the mark-sensing sheet so as to print a photograph marked by the user.

Such a mark-sensing sheet has a configuration such as is shown in FIG. 4. The mark-sensing sheet shown in FIG. 4 includes a mark field A, a thumbnail field B, a user instruction field C, and a bar code field E. The mark filed A is used to designate the size and kind of paper, a print option, the number of prints to make, etc. The thumbnail field B contains thumbnail images of image files stored in a storage medium (for example, a memory card or a digital camera connected via an interface such as USB). The thumbnail field B further includes mark fields used for designating printing of images corresponding to the thumbnail images. The user instruction field C contains a user instruction relating to printing (or further contains a reprint designation mark). The bar code field E is used to identify the type of mark-sensing sheet when the mark-sensing sheet is read by the scanner afterwards.

The user causes the MFP to print the mark-sensing sheet and marks a desired image shown in the thumbnail field B. Then, the user designates the size and kind of paper, a print option, and the number of prints to make via the mark field A. The user then allows the scanner to read the mark-sensing sheet. Thus, the user can print the desired image under conditions that the user desires.

Standardized storage medium disks, such as a CD-R and a DVD-R, have a specification such that the center of the storage medium disk is perforated with a hole for a spindle. In printing a photographic image on the surface of a storage medium disk, it is a concern if a portion of the photograph is in the portion of the storage medium disk where the hole is located. For example, in the case of printing an image of a person, if the face of the person shown in the center of the photograph is located at the position of the hole, the user cannot obtain a satisfactory result of printing of a label.

That is, when the shape of a print medium is a rectangle, just as a conventional paper (or a plastic sheet) medium of a standard size, a whole part of the photograph can be laid out without a large unpresented part. Accordingly, the user does not necessarily need to confirm a printed result in advance.

On the other hand, the storage medium disk has a special circular shape having a hole in the center thereof. Accordingly, unless a photograph is printed in a very small size, there is always an unprinted portion of an image to be printed, corresponding to the central hole of the storage medium disk. In performing printing on the label side of the storage medium disk, considering the unordinary special shape of the disk, the user needs to confirm the unprinted portion prior to printing.

For countermeasures against such confirmation, the MFP can include a color display unit so as to display a printed result prior to printing. However, with the color display unit installed, the cost of the entire apparatus will increase.

If software for causing a PC to display a print preview image is used, a printed result of the label side can be displayed. However, especially for an MFP for use at home, it is desired that the MFP adapts a product specification such that print control such as a direct print can be performed without using an external host device such as a PC to perform basic print control without using a PC as far as possible.

In this regard, Japanese Patent Application Laid-Open No. 2004-114485, Japanese Patent Application Laid-Open No. 2004-255760, and Japanese Patent Application Laid-Open No. 2003-30670 discuss a method for printing a photographic image while applying a layout thereto. However, they neither discuss the above problem nor propose any solution.

SUMMARY OF THE INVENTION

At least one exemplary embodiment of the present invention is directed to a method for easily and securely controlling a form of printing on a label side (a surface on which no data is recorded) of a recording medium whose printable area has an unordinary shape, such as, a storage medium disk including a CD-R and a DVD-R, with a printing apparatus that includes a limited user interface unit.

According to an aspect of the present invention, an image processing method includes: printing out a layout mark-sensing sheet including a plurality of sample image layout options that graphically indicate different layouts of an image to be printed on a recording medium that has a specific shape, the layout mark-sensing sheet allowing a user to mark the layout mark-sensing sheet to designate a specific image layout option from among the plurality of different sample image layout options; reading the layout mark-sensing sheet marked by the user; and printing out the image on the recording medium based on the specific image layout option designated by the user on the layout mark-sensing sheet.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments of the present invention, which relate to a multifunction peripheral (MFP) including an image reading unit (scanner) and an image recording unit (scanner), will now be described in detail with reference to the drawings. It should be noted that the relative arrangement of the components, the numerical expressions, and numerical values set forth in these embodiments do not limit the scope of the present invention unless it is specifically stated otherwise.

First Exemplary Embodiment

Figure 1:
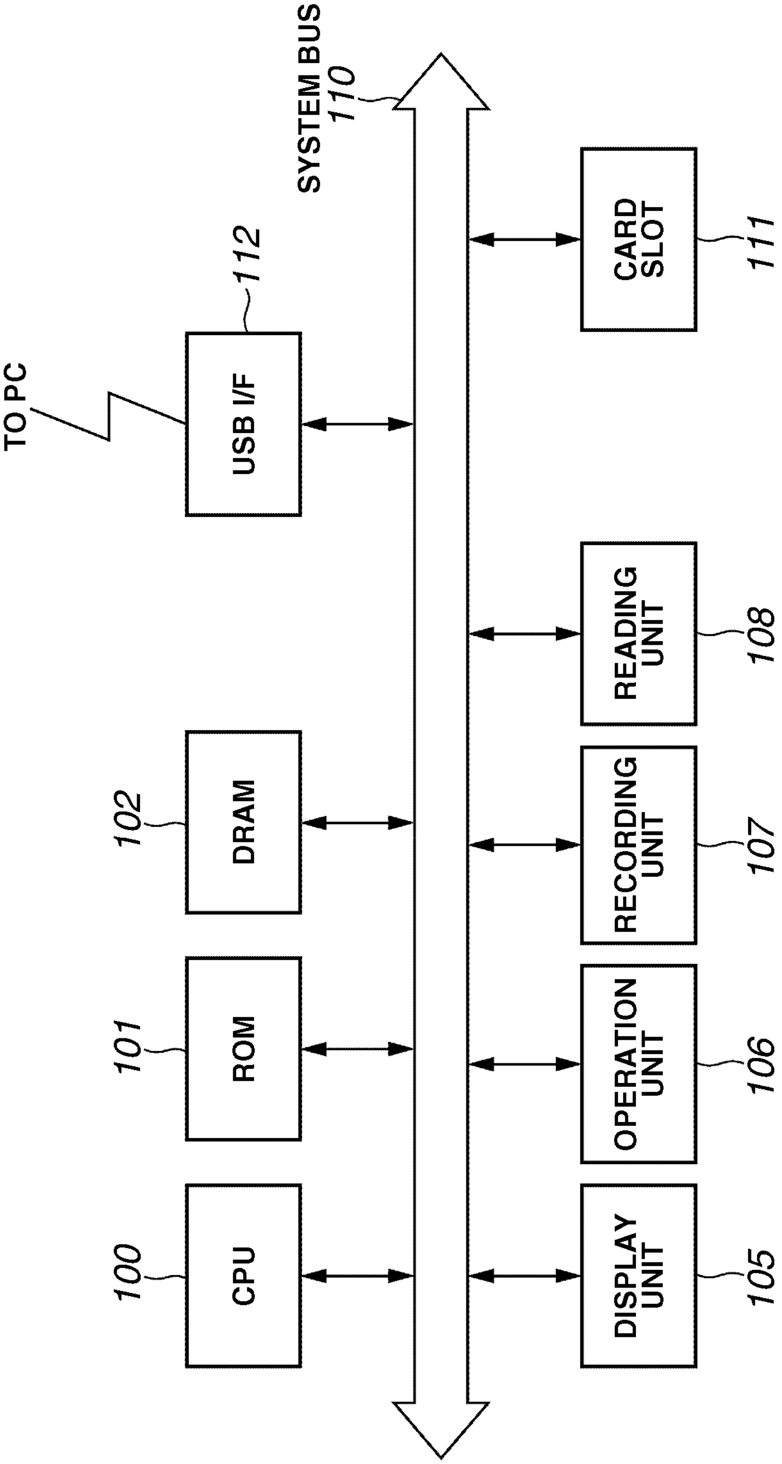
FIG. 1 illustrates a configuration of a control system of an MFP according to a first exemplary embodiment of the present invention.

FIG. 1 illustrates a configuration of a control system of an MFP according to a first exemplary embodiment of the present invention.

Referring to FIG. 1, the MFP includes a central processing unit (CPU) 100 that controls the MFP, a read-only memory (ROM) 101 that stores programs and data, and a storage unit 102, such as dynamic random access memory (DRAM) that stores CPU work data, data for display, and image data.

In addition, the MFP includes a display unit 105, an operation unit 106, a color reading unit 108, a recording unit 107, a card slot 111, and a USB interface 112. The display unit 105 includes a liquid crystal display (LCD) that displays a state of the MFP and a message for guiding an operation. The operation unit 106 includes a cursor key. The reading unit 108 includes a color charge-coupled device (CCD). The recording unit 107 includes an inkjet printer. The card slot 111 is capable of reading a memory card for a digital camera. The USB interface 112 is used for connecting to a PC when the MFP is used as a scanner, a printer, or a memory card reader.

Each of the units described above are mutually connected via a system bus 110.

Figure 2:
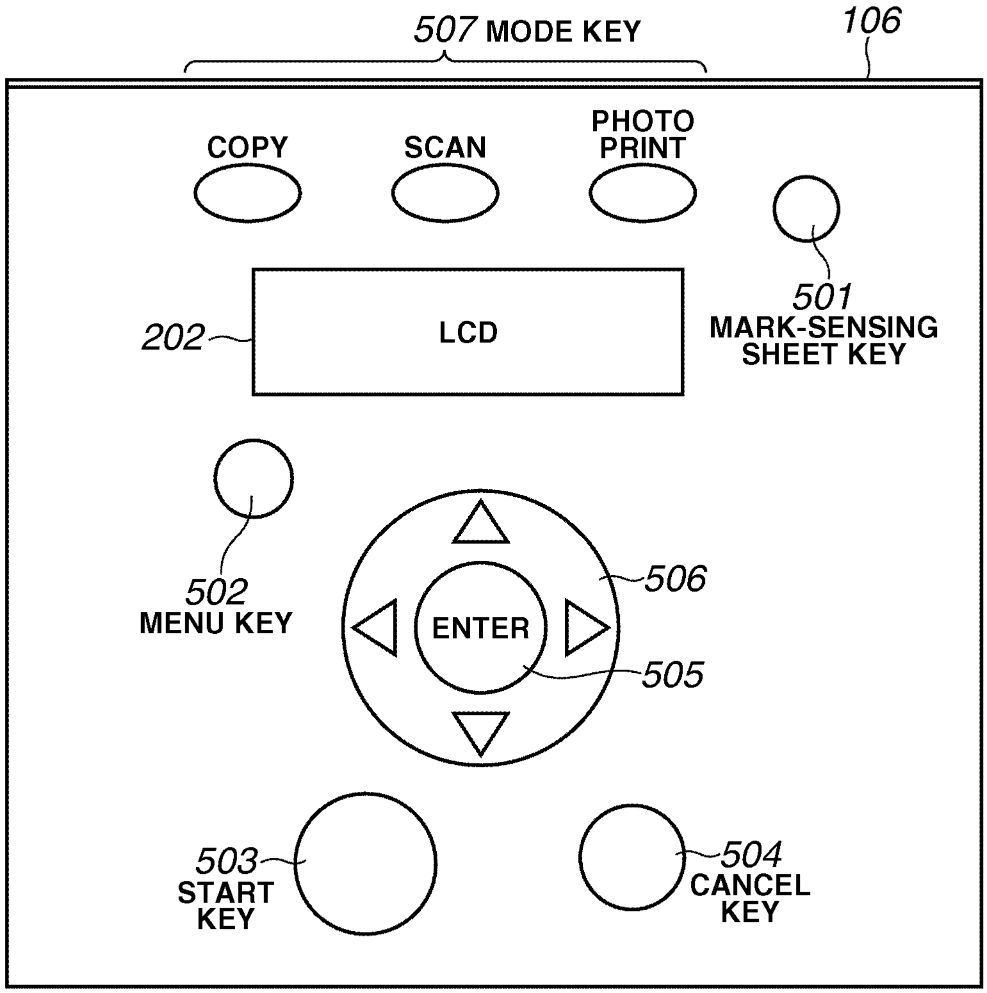
FIG. 2 illustrates a configuration of an operation unit of the MFP shown in FIG. 1 according to the first exemplary embodiment of the present invention.

FIG. 2 illustrates a configuration of the operation unit 106 of the MFP shown in FIG. 1. The operation unit 106 shown in FIG. 2 includes an LCD 202, mode keys 507, a menu key 502, up/down/left/right keys 506, an enter key 505, a start key 503, and a cancel key 504. The LCD 202 performs various kinds of displays described above. The mode keys 507 are used in designating an operation mode of the MFP. The menu key 502 is used for starting various kinds of setting modes. The up/down/left/right keys 506 are used for selecting between setting items and changing a value. The enter key 505 is a setting input key. The start key 503 is used for starting various kinds of jobs such as copying and scanning. The cancel key 504 is used for canceling a job and resetting a setting.

In addition, in the present exemplary embodiment, the operation unit 106 includes a mark-sensing sheet key 501. The mark-sensing sheet key 501 is used for print control using a mark-sensing sheet.

The mode keys 507, in the present exemplary embodiment, include three keys for respectively designating three modes, namely, a “copy” mode, a “scan” mode, and a “photo print” mode. Hereinbelow, each one of the mode keys 507 is referred to as the mode key 507.

Here, with respect to print control using a mark-sensing sheet, an example of a user interface that uses the mode key 507 and the mark-sensing sheet key 501 is described.

When a user presses the photo print key, for example, among the mode keys 507 and presses the mark-sensing sheet key 501, a menu for allowing the user to select processing such as “1. Print mark-sensing sheet” (an item 71 in FIG. 7) and “2. Read mark-sensing sheet” (an item 72 in FIG. 7) is displayed in a photo print (mark-sensing sheet) menu 70 on the LCD 202. The user can have the mark-sensing sheet printed or have the mark-sensing sheet read by pressing the enter key 505 after selecting from among the items 71, 72 . . . by using the up/down/left/right keys 506. In the example shown in FIG. 7, an operation of pressing the photo print key 507 before pressing the mark-sensing sheet key 501, which is performed in order to enter the menu, is displayed to allow the user to know a hierarchical structure of the menu.

A print operation for printing on a storage medium disk according to the present exemplary embodiment is described next. The storage medium disk is a storage medium such as a CD-R and a DVD-R, as described above. Hereinbelow, a CD-R is referred to as an example of the storage medium disk. However, the exemplary embodiments described below can be applied to another of storage medium disk as long as the storage medium disk has a similar outer shape.

In performing printing on a label side of the CD-R while applying a layout thereto, there are two different cases. One is a case where an image to be printed on the label side is already stored in the CD-R. The other is a case where an image to be printed on the label side is stored in another storage medium or in another storage area (in this case, the image to be printed on the label side can be the same image stored in the CD-R or another different image).

However, the present invention is not limited by an input route of an image to be printed on the label side of the CD-R. That is, the route of input of the image to be printed on the label side can be arbitrarily determined.

For example, an image to be printed on the label side can be input via a given interface from an external digital camera. In addition, an image that is previously stored in a storage unit (DRAM or an HDD (not shown)) of the MFP can be input as an image to be printed on the label side. In addition, if the MFP incorporates therein a drive that can read from and write to the storage medium (CD-R) or if the drive can be connected to the MFP via an interface such as a USB, an image to be printed on the label side of the CD-R can surely be input by reading from the CD-R.

Supposing that an image to be printed on the label side is stored in a memory card (in this case, the image can be an arbitrary image and is not necessarily an image that is already (or to be) stored in the CD-R), the user inserts the memory card storing the image to be printed into the card slot 111, and then presses the photo print key 507 of the operation unit 106 shown in FIG. 2.

Then, the user presses the mark-sensing sheet key 501 and selects the printing of a mark-sensing sheet by using the menu interface described above so as to print a mark-sensing sheet.

Figure 4:
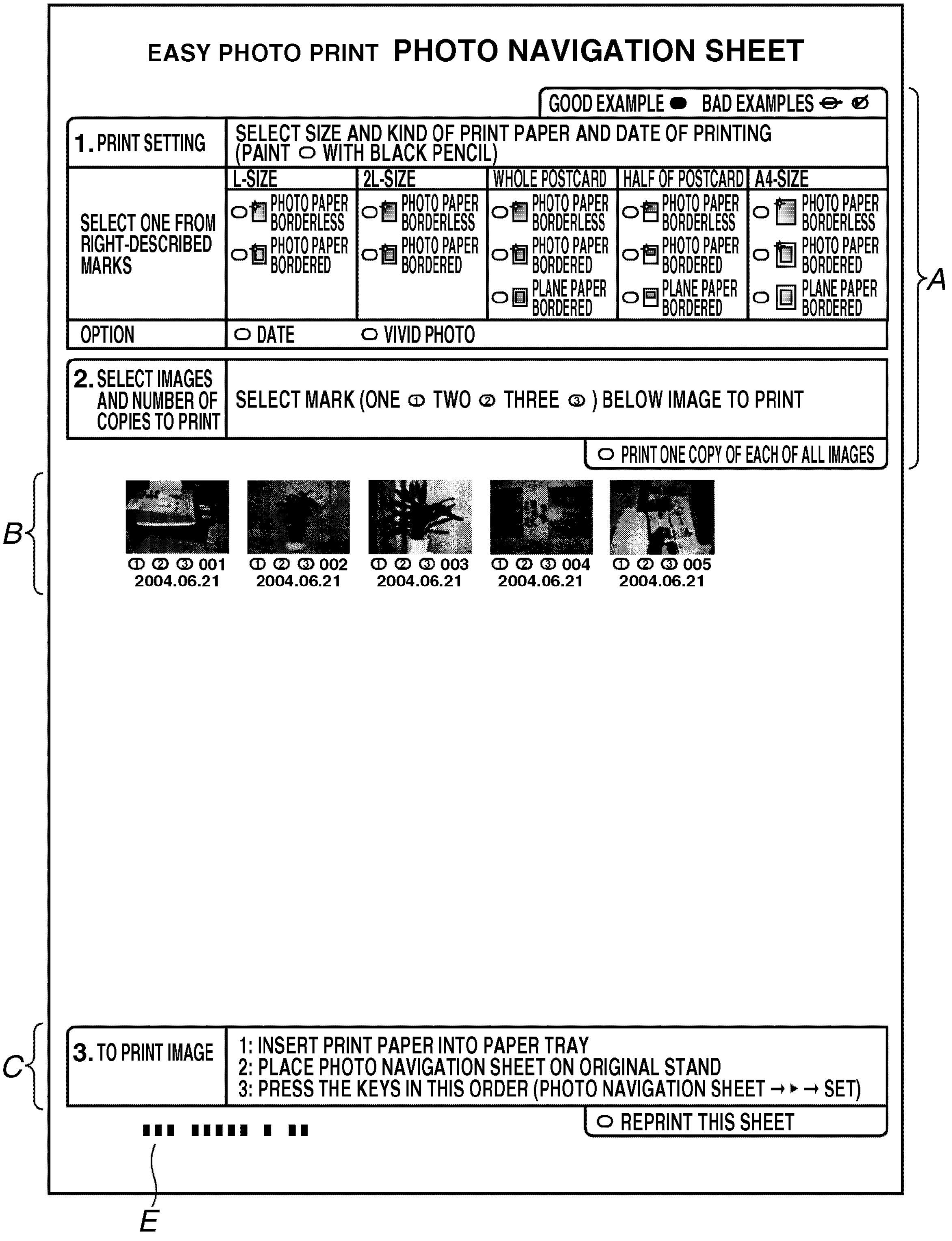
FIG. 4 illustrates a configuration of a conventional general mark-sensing sheet.
Figure 5:
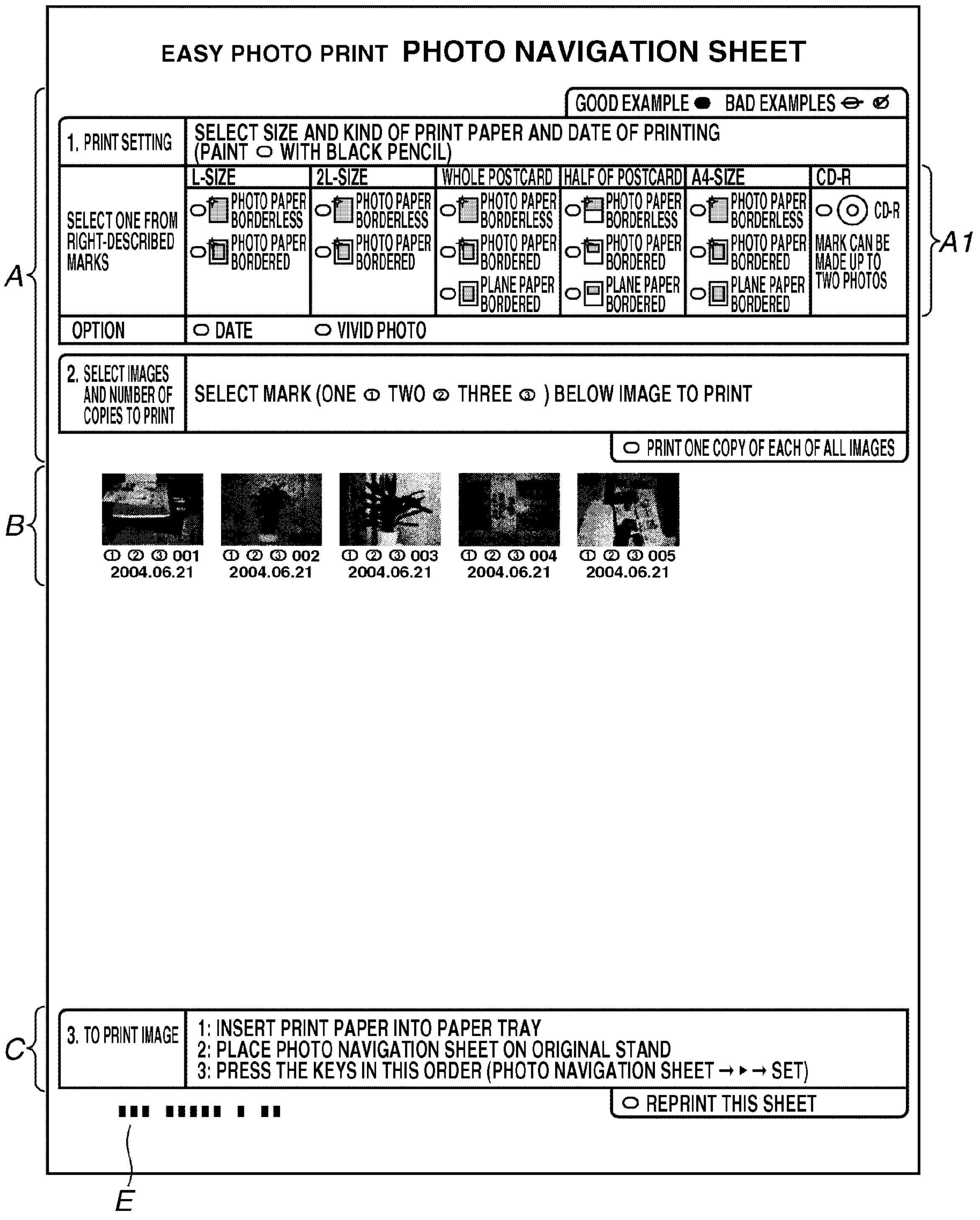
FIG. 5 illustrates a configuration of a first mark-sensing sheet that is used by the MFP shown in FIG. 1 according to the first exemplary embodiment of the present invention.

In response to the operation by the user described above, the MFP prints out a mark-sensing sheet such as the one shown in FIG. 5 (a first mark-sensing sheet) in the present exemplary embodiment. In a thumbnail field B of the mark-sensing sheet shown in FIG. 5, thumbnail images of images stored in the memory card and print designation mark fields corresponding to the thumbnail images are disposed just as in the example shown in FIG. 4. The mark-sensing sheet shown in FIG. 5 and a conventional mark-sensing sheet (FIG. 4) are different from each other in a configuration of a mark field A.

That is, in the case of the mark-sensing sheet shown in FIG. 5, the mark field A includes a mark field A1 for designating the label side of a CD-R as a print medium.

In the present exemplary embodiment, the user can mark a desired image shown in the thumbnail field B and put a mark on the mark field A1. When the user has the mark-sensing sheet shown in FIG. 5 read by the MFP, the MFP prints out a second mark-sensing sheet such as the one shown in FIG. 6.

In the present exemplary embodiment, up to two images can be designated by putting a mark on the mark field A1. However, the number of images to be designated can be arbitrarily restricted. That is, the restriction on the number of images to be designated can be appropriately determined based on whether the number of images is prioritized or whether the number of layouts is prioritized on a single second mark-sensing sheet shown in FIG. 6. In addition, the number of images (an upper limit of the number of images) to be designated by putting a mark on the mark field A1 can be changed via an appropriate user interface.

Figure 6:
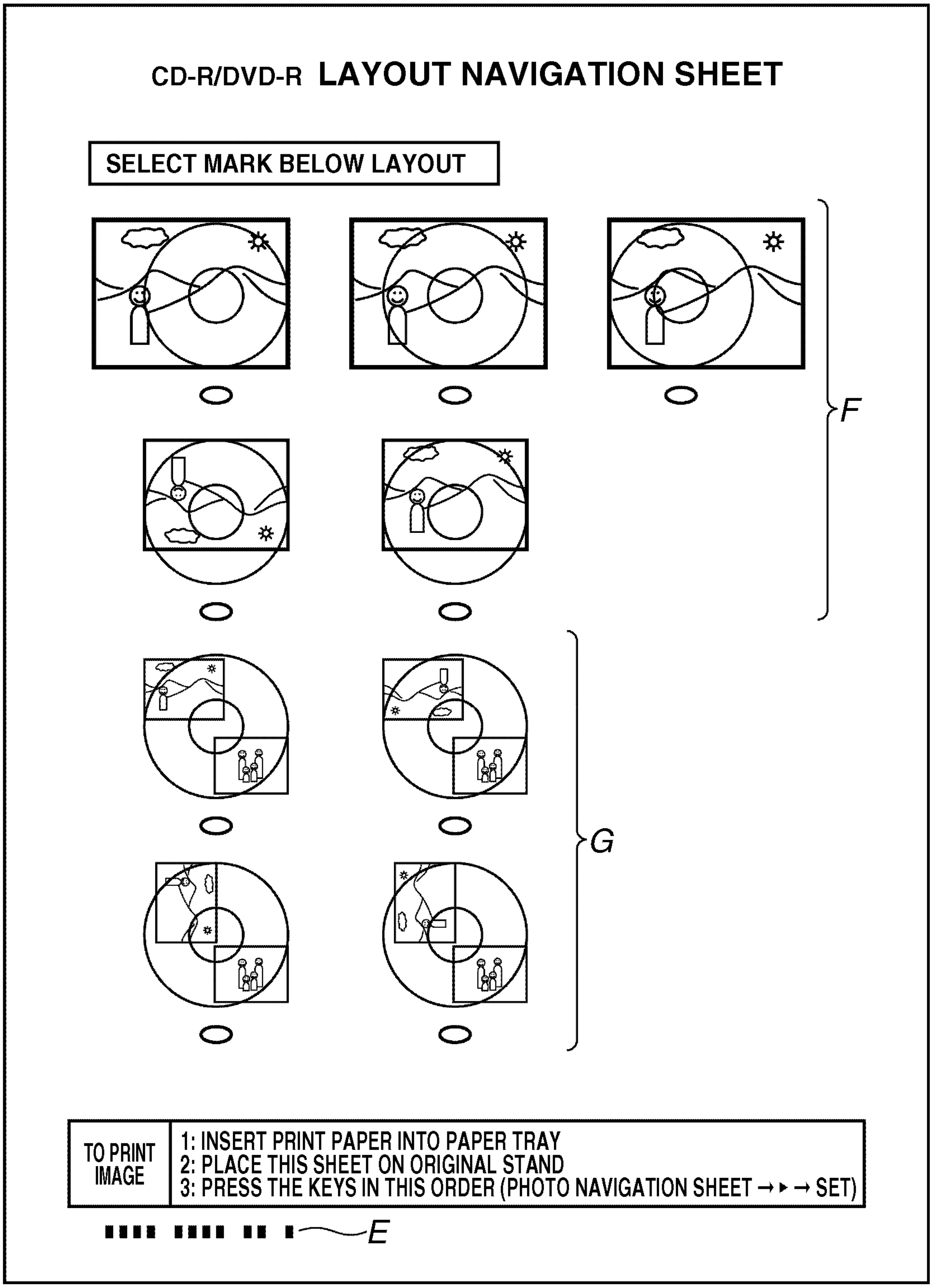
FIG. 6 illustrates a configuration of a second mark-sensing sheet that is used by the MFP shown in FIG. 1 according to the first exemplary embodiment of the present invention.

The second mark-sensing sheet shown in FIG. 6 is a "layout navigation sheet (layout mark-sensing sheet)". In the layout navigation sheet, images are printed and arranged in a plurality of types of layouts to show a finished state (layout) of printing. The user can confirm the state of layout of printing on the label side of a CD-R. The user marks a desired layout shown in the second mark-sensing sheet (FIG. 6) and has the second mark-sensing sheet read again by the MFP. Thus, the MFP can print an image in the desired layout on the label side of a CD-R.

In the mark-sensing sheet shown in FIG. 5, images can be designated (by marking the mark field A1) up to two images in the present exemplary embodiment. Accordingly, in FIG. 6, a layout state for the label side of a CD-R is produced by using one or two images for printing.

That is, in a portion indicated by "F" in FIG. 6, layout candidates when one photograph is designated by the user are presented to the user. When the user desires to print a photograph of a person, the person is often taken in a central portion of the photograph. Thus, if the central portion of the photograph is located at a position corresponding to the position of a central hole of a CD-R, the photograph with no face of the person shown is undesirably printed on the label side. In order to prevent this, a plurality of layout candidates are presented to the user so that the user can make a selection as to which portion of the photograph is to be printed on the label side of a CD-R.

In the second mark-sensing sheet shown in FIG. 6, with a circle that indicates a printing area of a CD-R while overlapping a photograph selected by the user, a layout state for the label side of the CD-R is presented.

In addition, a portion "G" shown in FIG. 6 is not printed when only one photograph is designated. However, when two photographs are designated by the user, the portion G presents layout candidates to the user as shown in FIG. 6. In the portion G, the layout candidates produced by using two photographs are printed.

In addition, in arranging a plurality of photographs, a mutual relationship of the photographs in the layout is significant. That is, one of the two photographs may be vertically oriented or may be upside down in some cases. In this regard, in the portion G in FIG. 6, a plurality of layout candidates are presented to the user so that the user can select as to a relative relationship between the two photographs. In the portion G, an image of a photograph selected by the user via the first mark-sensing sheet and a circle that indicates a printing area of the CD-R are drawn in an overlapped manner.

In addition, the layout state in the portion F or the portion G shown in FIG. 6 can be edited as desired by the user using an external unit such as a PC. In the case where the MFP is designed with a specification for a home-use apparatus, the layout state can be automatically produced to improve a convenience for the user and to reduce costs for manufacturing apparatuses.

In the layouts shown in the portion F according to the present exemplary embodiment, a circumferential circle of a CD-R is drawn so as to inscribe the circle at a side or sides that configure a rectangular area of an image. The layouts shown in the portion F are produced by changing a form of inscribing in a manner such that the outer circumferential circle is inscribed at the right side, at the central portion of the rectangular area, at the left side, at three sides of the rectangular area, at three sides of the rectangular area with an image being disposed upside down, and the like. The layouts shown in the portion G are produced in a manner such that two images are arranged so that a central portion of each image is covered largest on the printing side except for the portion of the hole in the center of the CD-R and that the orientation of one image is changed by 90 degrees.

The forms of the plural layouts in the mark-sensing sheet can be formed as plural different print forms on the mark-sensing sheet by image processing for changing a position of the image to be printed in the concentric printable area of the label side of the CD-R, changing a magnification ratio of the image to be printed in the printable area of the label side of the CD-R, or changing a state of rotation or a state of flip of the image (reversed state as to a vertical or horizontal direction of the image).

In addition, by presenting the layouts in the number shown in FIG. 6, various principal portions of the rectangular image can be covered. That is, unless an image has an extremely unordinary composition, layouts that satisfy most users can be presented for a snap shot of a person, a group photograph, or a portrait, for example.

In the example shown in FIG. 6, the plural layouts are produced by a combination of a change in the position and the magnification ratio of an image to be printed and the flip of an image. However, not all the image processings are necessarily applied in producing the layouts. For example, the layouts can be produced by selecting appropriate image processing only based on a condition such that items to be designated are restricted by the content that can be contained in one mark-sensing sheet.

Figure 3:
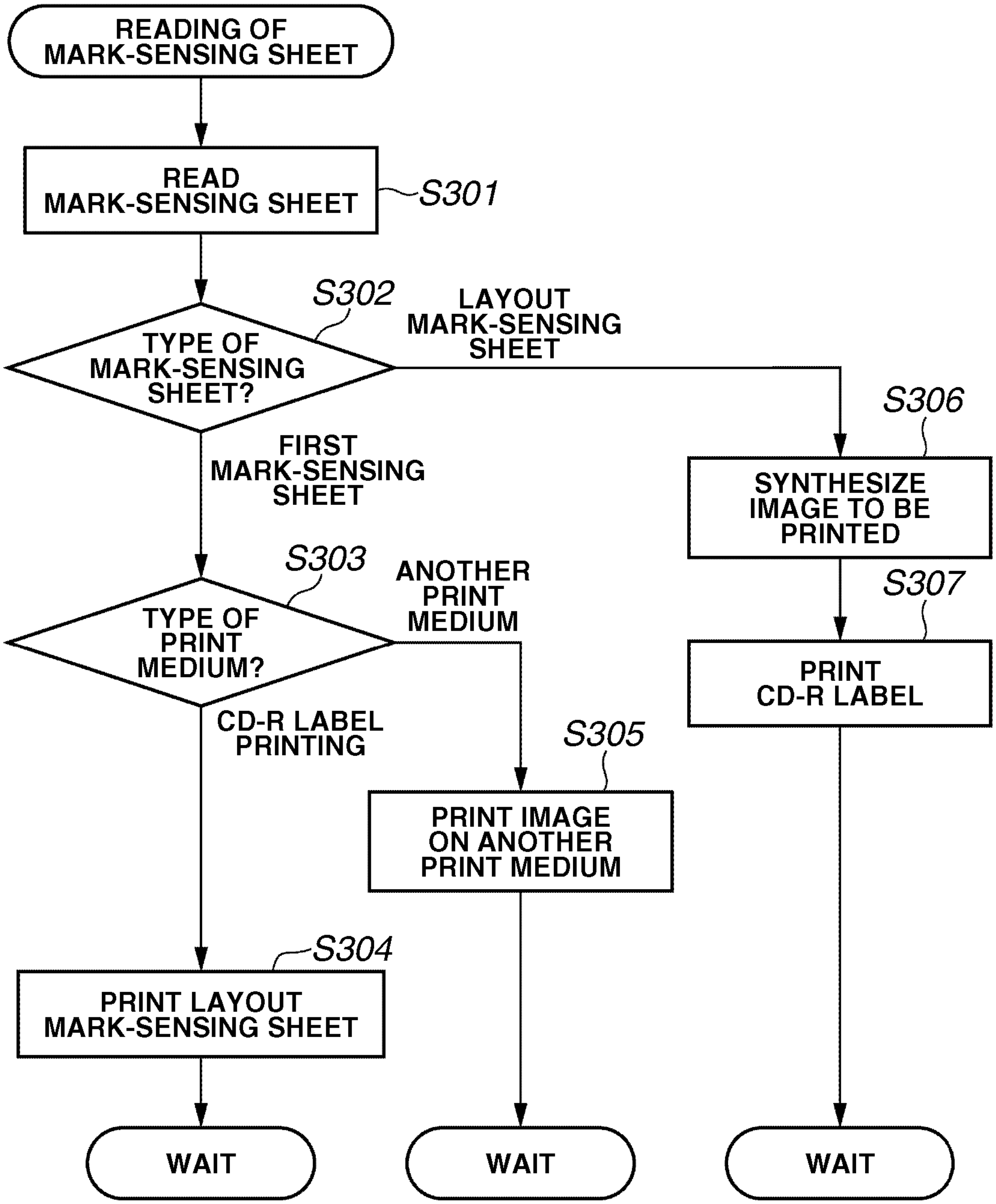
FIG. 3 is a flow chart illustrating print control by the MFP shown in FIG. 1 according to the first exemplary embodiment of the present invention.

Next, a description is made as to the processing for controlling printing performed by using the first and the second mark-sensing sheets with reference to FIG. 3, focusing on the processing after reading of the mark-sensing sheet. Steps shown in FIG. 3 can be stored in the ROM 101 as a control program for the CPU 100.

First, the user places the marked first or second mark-sensing sheet on a platen glass of the reading unit 108, and then performs an operation for reading the mark-sensing sheet via the operation unit 106 (step S301).

Then, in step S302, the CPU 100 determines a type of the read mark-sensing sheet. In the present exemplary embodiment, the mark-sensing sheet includes the first mark-sensing sheet shown in FIG. 5 and the second mark-sensing sheet shown in FIG. 6. In each of the first and the second mark-sensing sheets, identification information that is unique to each of the first and the second mark-sensing sheets is printed on the mark-sensing sheet as a bar code E of the first and the second mark-sensing sheet. By reading the bar code information, the CPU 100 can readily determine whether the scanned mark-sensing sheet is the first mark-sensing sheet (FIG. 5) or the second mark-sensing sheet (FIG. 6).

If the first mark-sensing sheet shown in FIG. 5 is detected in step S302, the processing advances to step S303. On the other hand, if the second (layout) mark-sensing sheet shown in FIG. 6 is detected, the processing advances to step S306.

In step S303, the CPU 100 checks a state of marking in the mark field A and the mark field A1 and determines a designation as to the type and size of a print medium.

When it is determined that CD-R label printing is designated by marking in the mark field A1, the processing advances to step S304. In step S304, the second (layout navigation) mark-sensing sheet shown in FIG. 6 is printed out, and then the processing returns to a standby state.

On the other hand, when it is determined that CD-R label printing is not designated by the mark field A1, the CPU 100 performs image printing on a print medium designated in step S305 in an ordinary manner. After the printing is completed, the processing returns to a standby state.

After the second mark-sensing sheet (FIG. 6) is printed out (step S304), the user selects a desired layout from among the layouts shown in the second mark-sensing sheet and marks the selected layout. Then, the user places the second mark-sensing sheet on the platen glass of the color reading unit 108, and then performs an operation for reading the mark-sensing sheet (for example, an operation using the scan key among the mode keys 507 of the operation unit 106).

In this manner, the processing shown in FIG. 3 restarts. In this case, the processing advances from step S302 to step S306. In step S306, the CPU 100 synthesizes an image to be printed on the label side of a CD-R. More specifically, in step S306, the CPU 100 performs processing such that a non-printing portion of the image of the selected photograph is masked according to the designated layout and, when it is necessary, performs magnification processing according to an actual dimension of the CD-R to produce the obtained image on the DRAM 102.

A condition for synthesizing an image for producing the layout, for example, a processing condition such that the outer circumferential circle is inscribed at the right side, at the central portion of the rectangular area, at the left side, at three sides of the rectangular area, at three sides of the rectangular area with an image being disposed upside down, and the like, as shown in the portion F in FIG. 6, is previously linked with each layout image shown in FIG. 6 and is stored. When the user designates a layout by marking on the mark field disposed below each layout image shown in FIG. 6, the corresponding condition for image synthesis is selected to perform the image synthesis for laying out an image under the selected condition.

Then, in step S307, the CPU 100 causes the recording unit 107 to print the image obtained in step S306 on the label side of a CD-R. A mechanism for directly printing an image by inserting a CD-R medium into a printing mechanism such as an inkjet printer is publicly known, and accordingly, a detailed description thereof is not included here.

As described above, according to the present exemplary embodiment, when the user designates an image via the first mark-sensing sheet (FIG. 5) and designates the label side of a storage medium disk (CD-R) as a print medium, the second mark-sensing sheet (FIG. 6), namely, a layout mark-sensing sheet (layout navigation sheet) is printed out. Accordingly, even in an apparatus having no image display device (color CCD), the user can, using the second mark-sensing sheet (FIG. 6), visually confirm a final print state in the printable area (for example, in the case of the CD-R, a doughnut shape) of the storage medium disk. In addition, with the second mark-sensing sheet (FIG. 6), various different states of layout are output. Accordingly, the user can perform printing on the label side of the storage medium disk in an optimum (desired) layout.

In addition, in the present exemplary embodiment, the layouts in the second mark-sensing sheet (FIG. 6) need to be produced to be printed only for images selected by designating images via the first mark-sensing sheet (FIG. 5). Accordingly, plural layouts can be presented by the second mark-sensing sheet (FIG. 6), and when the user designates an image, the user can easily designate the image via the first mark-sensing sheet (FIG. 5) even when there is no display unit or when the display area of a display is limited.

In the above description, a CD-R is used as a storage medium disk for easier understanding. However, similar print control can be implemented on another similar storage medium disk. In addition, in the above description, an image is directly printed on a storage medium disk. However, a similar method can also be applied in the case of printing on a sticker sheet that can be used as a label for a CD-R by trimming to a given printing area.

Second Exemplary Embodiment

In the first exemplary embodiment, when the label side of a storage medium disk (CD-R) is designated as a print medium via the first mark-sensing sheet (FIG. 5), the second mark-sensing sheet (FIG. 6) is printed out.

However, the type of the mark-sensing sheet printed in this case is not necessarily selected by control described in the first exemplary embodiment.

Figure 9:
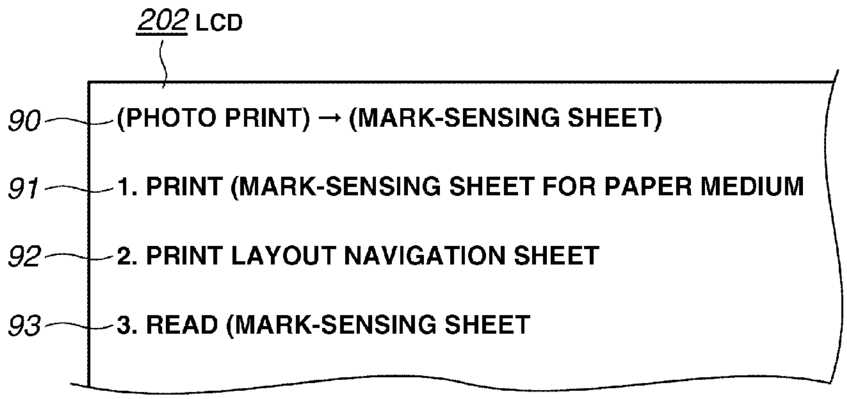
FIG. 9 illustrates a configuration of a user interface related to the mark-sensing sheet according to the second exemplary embodiment of the present invention.
Figure 10:
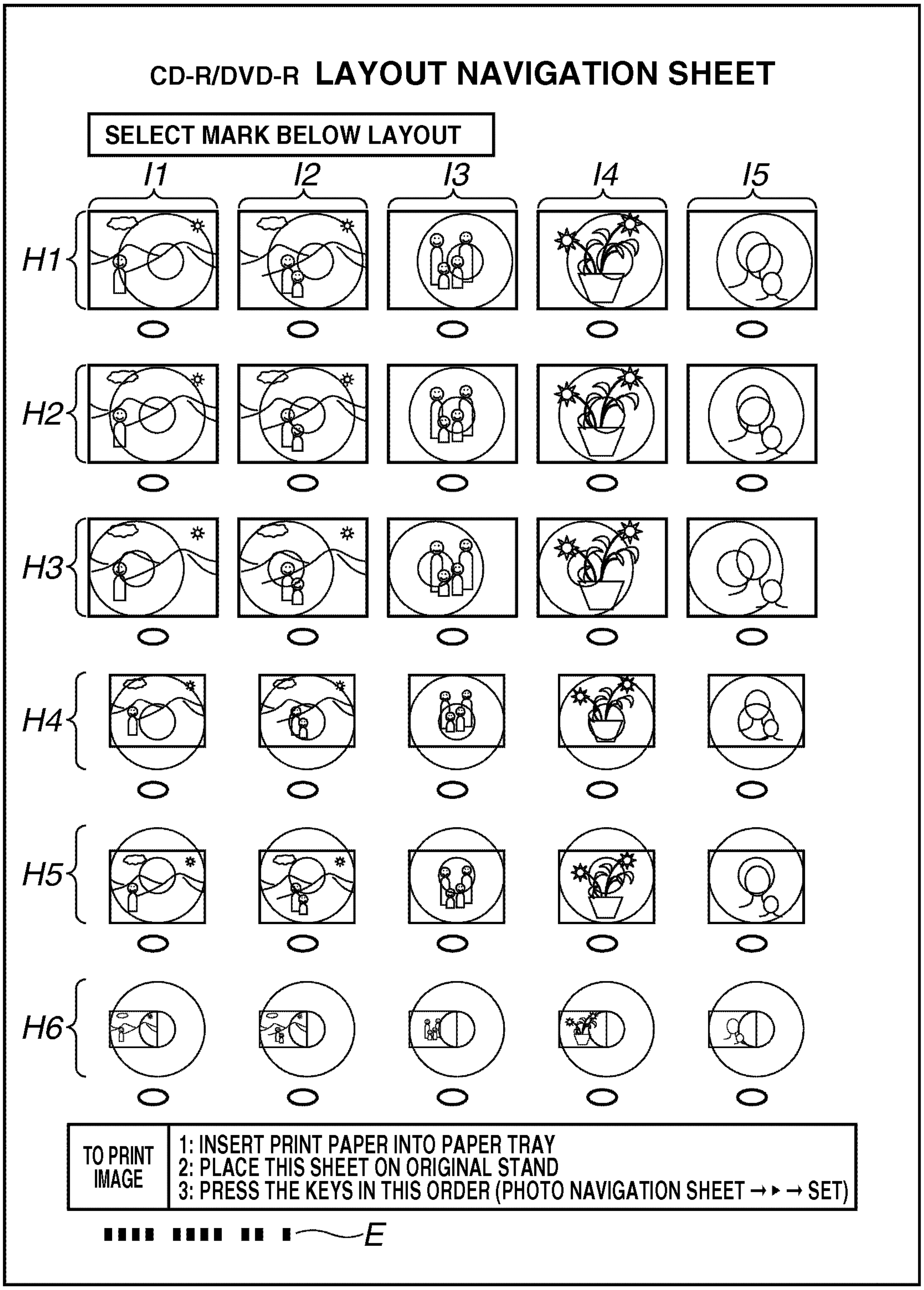
FIG. 10 illustrates a configuration of a second mark-sensing sheet according to the second exemplary embodiment of the present invention.

That is, for example, supposing that a hardware configuration of the MFP is similar to the hardware configuration of the first exemplary embodiment, the configuration of a second exemplary embodiment can be arranged such that a menu interface such as the one shown in FIG. 9 is displayed according to an operation in the order from the "photo print key" to the "mark-sensing sheet key", and a second mark-sensing sheet (layout navigation sheet) shown in FIG. 10 is directly printed out by an operation via the menu interface.

Figure 7:
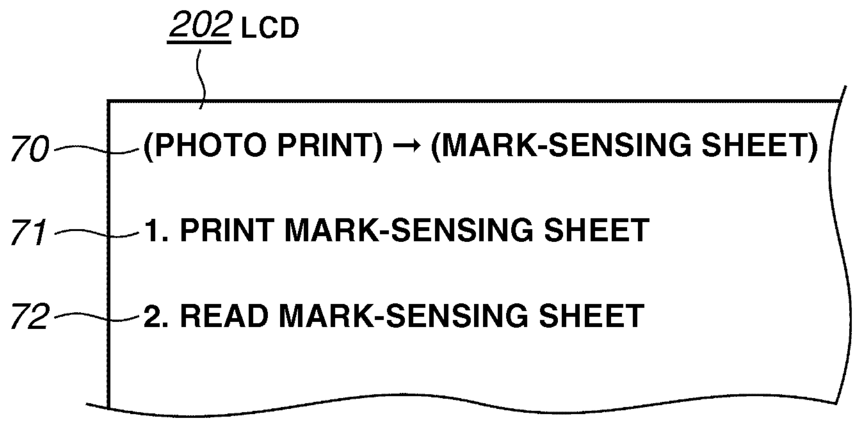
FIG. 7 illustrates a configuration of a user interface related to the mark-sensing sheet that is used by the MFP shown in FIG. 1 according to the first exemplary embodiment of the present invention.

Referring to FIG. 9, a menu title 90 is similar to the menu title 70 shown in FIG. 7, and a menu item 93 is provided for designating the reading of a mark-sensing sheet, which is similar to the menu tem 72 shown in FIG. 7.

A menu item 91 is provided for designating the printing of a mark-sensing sheet for a paper medium. A menu item 92 is provided for designating the printing of a layout navigation sheet (in the present exemplary embodiment, the term "layout navigation sheet" is principally used) for a storage medium disk.

If the printing of a layout navigation sheet for a storage medium disk can be directly designated via the menu shown in FIG. 9, the layout navigation sheet (FIG. 10) can be obtained by the first printing of a mark-sensing sheet.

Images that are output to the layout navigation sheet (FIG. 10) with a layout can be separately selected via another appropriate user interface. In addition, the configuration of the present exemplary embodiment can be arranged such that all of the images that are stored in a storage area (a specific folder in a memory card) are output to the layout navigation sheet.

The mark-sensing sheet for a paper medium that is printed with the designation via the menu item 91 can be the same mark-sensing sheet as the conventional mark-sensing sheet shown in FIG. 4 or can be the first mark-sensing sheet (the mark-sensing sheet that includes the mark field A1 for designating the printing of the second mark-sensing sheet) according to the first exemplary embodiment shown in FIG. 5. With the first mark-sensing sheet shown in FIG. 5 used as the mark-sensing sheet for a print medium that is printed with the designation via the menu item 91, similar control as in the first exemplary embodiment can be implemented.

The layout navigation sheet for a storage medium disk to be printed with the designation via the menu item 92 has a configuration shown in FIG. 10, for example.

The layout navigation sheet shown in FIG. 10 has plural layout images disposed in two dimensions vertically and horizontally. In the example shown in FIG. 10, each layout image is produced in a manner such that the same image is used in the same column (vertical direction: columns I1 through I5) and the same layout is used in the same row (horizontal direction: rows H1 through H6). Different layouts are used in different rows.

For example, in the layouts in the columns H1 through H3, the circumferential circle of a storage medium disk is inscribed at two sides of the rectangle of an image, and the circumferential circle of a storage medium disk is located in a right portion, a central portion, and a left portion of the image, respectively. In the layouts in the columns H4 and H5, an image is magnified so that the circumferential circle of a storage medium disk is inscribed at three sides of the rectangle of the image. In the layout in the column H4, the circumferential circle of a storage medium disk is inscribed at an upper side of the rectangle of the image. In the layout in the column H5, the circumferential circle of a storage medium disk is inscribed at a lower side of the rectangle of the image.

In the layout in the column H6, an image is magnified to be disposed so that the area of the image is contained as much as possible in one region of the concentric label side (printable area) ranging from a central portion to a left portion thereof. In the example shown in FIG. 10, the length of a nonprinting area in the central portion of the disk and the length of an image are equal to each other, and a radius of the concentric circle of the printable area and a width of the image are equal to each other. However, it is difficult to adjust the length and the width of the image to be equal to the dimension of the storage medium disk. Accordingly, layouts similar to the layouts in the column H6 can be implemented by magnifying an image so that the length or the width of the image has the above-described relationship with the dimension of the image.

If all of the layouts of an image cannot be output in one layout navigation sheet, control can be performed so that a plurality of layout navigation sheets are output. This configuration can also be implemented in the first exemplary embodiment in a similar manner.

In addition, in the bar code portion E of the layout navigation sheet shown in FIG. 10, information for discriminating the layout navigation sheet shown in FIG. 10 from mark-sensing sheets having a different format (the mark-sensing sheet shown in FIG. 4, FIG. 5, or FIG. 6) is recorded. By using the bar code information, subsequent analysis processing (processing in step S302, for example) can be readily and securely performed.

Figure 8:
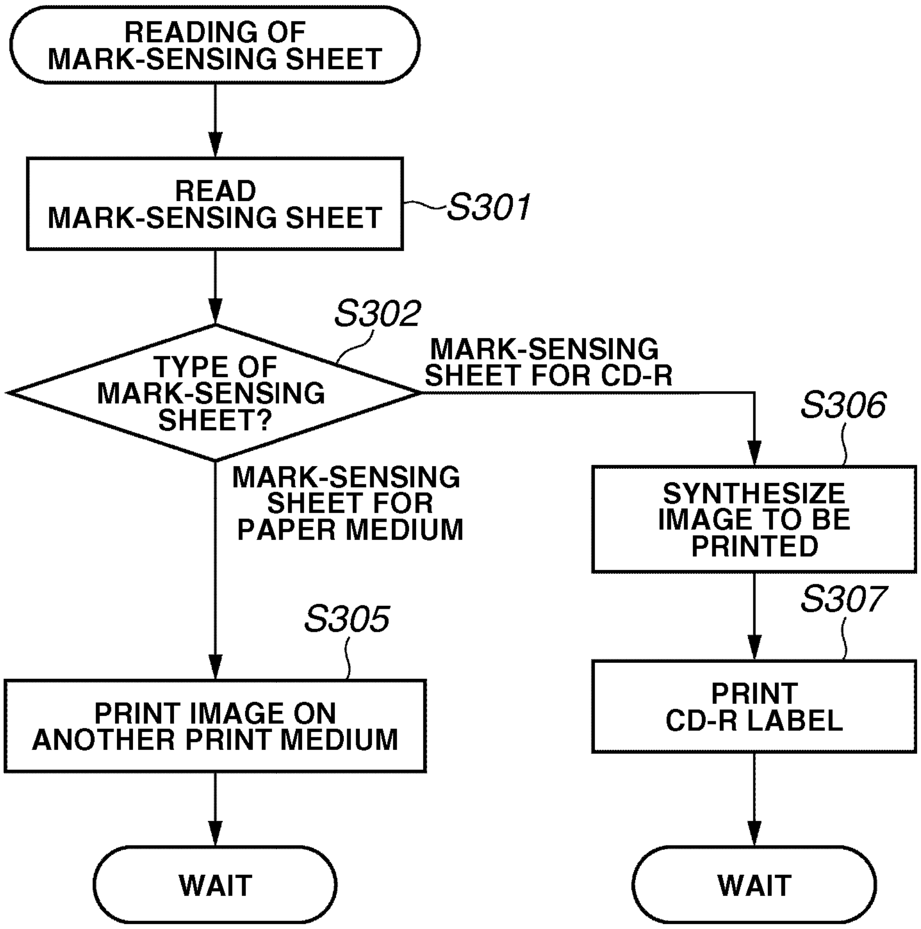
FIG. 8 is a flow chart illustrating print control according to a second exemplary embodiment of the present invention.

Next, a print control procedure performed by using the mark-sensing sheet (layout navigation sheet) shown in FIG. 10 is described with reference to FIG. 8, focusing on the processing after reading of the mark-sensing sheet. In FIG. 8, similar steps as those described with reference to FIG. 3 are denoted by the same step numbers. The procedure shown in FIG. 8 can be stored in the ROM 101 as a control program for the CPU 100, just as in the case of the first exemplary embodiment.

First, the user selects and marks a desired layout from among the layouts shown in the mark-sensing sheet shown in FIG. 10. Then, the user places the marked mark-sensing sheet on a platen glass of the color reading unit 108 (FIG. 1) and then performs an operation for reading the mark-sensing sheet (step S301).

Then, in step S302, the CPU 100 determines the type of the read mark-sensing sheet based on the image of the read mark-sensing sheet. The mark-sensing sheet that is determined in step S302 can be the mark-sensing sheet for a paper medium (the conventional mark-sensing sheet shown in FIG. 4 or the mark-sensing sheet according to the first exemplary embodiment shown in FIG. 5) or the layout navigation sheet (the mark-sensing sheet for a CD-R) shown FIG. 10. The determination on the type of the mark-sensing sheet can be made based on the bar code information (information recorded in the portion E of each mark-sensing sheet).

If the mark-sensing sheet for a paper medium is detected in step S302, then in step S305, printing on a paper medium is performed, and then the processing returns to a standby state.

On the other hand, if the read mark-sensing sheet is the layout navigation sheet shown in FIG. 10, the processing advances to step S306.

In step S306, the CPU 100 performs processing such that a nonprinting portion of the image of a selected photograph is masked according to the designated layout and, when it is necessary, performs magnification processing according to an actual dimension of a CD-R so as to produce the obtained image on the DRAM 102.

Then, in step S307, the CPU 100 causes the recording unit 107 (FIG. 1) to print an image obtained in step S306 on the label side of a CD-R.

According to the present exemplary embodiment, the layout navigation sheet for the label side of a storage medium disk can be directly output via the menu user interface. Accordingly, the user can easily and immediately begin a consideration on the print layout. In addition, in the layout navigation sheet, the images to be laid out and the types of the layout are arranged in a given order in the directions of the column and the row in a given regulation. Accordingly, the user can readily understand the significance of the output of the layout and finds a desirable layout in a short period of time.

The image processing method according to an exemplary embodiment of the present invention is not limited by a type of image processing apparatus (for example, an MFP according to the exemplary embodiments described above) that implements the image processing method. That is, the image processing method according to an exemplary embodiment of the present invention can be implemented by various image processing apparatuses having a reading unit and a recording unit. The control program according to an exemplary embodiment of the present invention can be stored in a medium such as a ROM of the image processing apparatus at the time of shipment of the image processing apparatus, and can also be supplied to the image processing apparatus from various external storage media (a CD-ROM and a flexible disk, for example), or can also be supplied to the image processing apparatus from an arbitrary server via a network.

According to the above configuration, the user can confirm a plurality of different print forms of an image to be printed on a recording medium having a specific shape via the layout mark-sensing sheet, and can also designate a desirable printing form from among the plural different print forms by marking the desirable printing form so as to use the designated print form for printing. In addition, the form of printing on the label side (the side on which no data is recorded) of a recording medium whose printable area has an unordinary shape, such as a storage medium disk including a CD-R and a DVD-R, can be readily and securely controlled by a printing apparatus that has a limited user interface unit.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-317858 filed Nov. 1, 2005, which is hereby incorporated by reference herein in its entirety.

What is claimed is:

1. An image processing method comprising:

deciding, in an image to be printed on a printing area of a predetermined shape which has been determined as a shape of a print target, a plurality of printing areas of the predetermined shape in a plurality of patterns using the predetermined shape of a predetermined print medium commonly for the plurality of patterns;

generating a plurality of sample images for indicating the plurality of decided printing areas corresponding to the plurality of patterns for which the predetermined shape of the predetermined print medium is used commonly;

causing a printing apparatus to print a designation sheet including the generated sample images, the designation sheet allowing a user to designate a sample image from the plurality of sample images;

determining a sample image designated by a user in the designation sheet, based on a read image obtained by reading, by a reading apparatus, of the designation sheet; and causing a printing apparatus to print the printing area, corresponding to the determined sample image, in the image on a print medium of the predetermined shape.

2. The image processing method according to claim 1, wherein the plurality of sample images are generated by changing at least one of a position, a magnification ratio, a state of rotation, or a state of reversing of the image on a print medium of the predetermined shape.

3. The image processing method according to claim 1, further comprising:

causing a printing apparatus to print a first sheet, the first sheet allowing a user to designate printing of the image on a printing area of the predetermined shape;

acquiring a second read image obtained by reading, by a reading apparatus, of the first sheet; and wherein if it is determined, based on the acquired second read image, that printing of the designation sheet is designated by a user by using the first sheet, the designation sheet is printed by a printing apparatus as a second sheet.

4. The image processing method according to claim 1, wherein the predetermined shape is a shape of a storage medium disk.

5. The image processing method according to claim 1, wherein the plurality of sample images are generated by using an image selected by a user from a plurality of images stored in a memory.

6. The image processing method according to claim 5, wherein if a plurality of images are selected by a user, a sample image for specifying printing areas of the selected plurality of images is generated.

7. A non-transitory computer-readable storage medium storing a program for causing a computer to execute the image processing method according to claim 1.

8. An image processing apparatus comprising:

a deciding unit configured to decide, in an image to be printed on a printing area of a predetermined shape which has been determined as a shape of a print target, a plurality of printing areas of the predetermined shape in a plurality of patterns by using the predetermined shape of a predetermined print medium commonly for the plurality of patterns;

a generating unit configured to generate a plurality of sample images indicating the plurality of printing areas, corresponding to the plurality of patterns for which the predetermined shape of the predetermined shape print medium is used commonly, decided by the deciding unit in the image;

a first print control unit configured to cause a printing apparatus to print a designation sheet including a plurality of sample images generated by the generating unit, the designation sheet allowing a user to designate a sample image from the plurality of sample images;

a determining unit configured to determine a sample image designated by a user in the designation sheet, based on a read image obtained by reading, by a reading apparatus, of the designation sheet printed by the first print control unit; and a second print control unit configured to cause a printing apparatus to print the printing area, corresponding to the sample image determined by the determining unit, in the image on a print medium of the predetermined shape.

9. The image processing apparatus according to claim 8, wherein the generating unit generates the plurality of different sample images by changing at least one of a position, a magnification ratio, a state of rotation, or a state of reversing of the image on a print medium of the predetermined shape.

10. The image processing apparatus according to claim 8, further comprising:

a third print control unit configured to print a first sheet, the first sheet allowing a user to designate printing of the image on a printing area of the predetermined shape; and an acquiring unit configured to acquire a second read image obtained by reading, by a reading apparatus, of the first sheet; and wherein the first print control unit causes a printing apparatus to print the designation sheet as a second sheet if it is determined, based on the second read image acquired by the second acquiring unit, printing of the designation sheet is designated by a user by using the first sheet.

11. The image processing apparatus according to claim 8, wherein the predetermined shape is a shape of a storage medium disk.

12. The image processing apparatus according to claim 8, wherein the generating unit generates the plurality of sample images by using an image selected by a user from a plurality of images stored in a memory.

13. The image processing apparatus according to claim 12, wherein if a plurality of images is selected by a user, the generating unit generates a sample image for specifying printing areas of the selected plurality of images.

* * * * *